(12) United States Patent  
Okuike

(10) Patent No.: US 12,101,571 B2
(45) Date of Patent: Sep. 24, 2024

(54) SOLID-STATE IMAGING APPARATUS FOR PERFORMING NOISE REDUCTION PROCESSING ON IMAGE DATA

(71) Applicant: Sony Semiconductor Solutions Corporation, Kanagawa (JP)

(72) Inventor: Kazuyuki Okuike, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 108 days.

(21) Appl. No.: 17/798,085

(22) PCT Filed: Mar. 12, 2021

(86) PCT No.: PCT/JP2021/010003
§ 371 (c)(1),
(2) Date: Aug. 8, 2022

(87) PCT Pub. No.: WO2021/187350
PCT Pub. Date: Sep. 23, 2021

(65) Prior Publication Data
US 2023/0156375 A1    May 18, 2023

(30) Foreign Application Priority Data

Mar. 19, 2020  (JP) ................................. 2020-049488

(51) Int. Cl.
*H04N 25/78*  (2023.01)
*H04N 23/61*  (2023.01)

(52) U.S. Cl.
CPC ............. *H04N 25/78* (2023.01); *H04N 23/61* (2023.01)

(58) Field of Classification Search
CPC ........ H04N 25/78; H04N 23/61; H04N 23/81; H04N 25/60; H04N 25/79
USPC ......................................................... 348/302
See application file for complete search history.

(56) References Cited

U.S. PATENT DOCUMENTS

2008/0284892 A1\* 11/2008 Ito ........................... H04N 25/57
                                                                                                      348/311
2016/0000383 A1\*  1/2016 Lee .......................... A61B 5/721
                                                                                                      600/301
2016/0373645 A1\* 12/2016 Lin .......................... H04N 23/63
                                                (Continued)

FOREIGN PATENT DOCUMENTS

JP    2020-25268   A        2/2020
JP    2020025268  A   *    2/2020      ............. H04N 23/61
                                                (Continued)

OTHER PUBLICATIONS

International Search Report and Written Opinion mailed on May 25, 2021, received for PCT Application PCT/JP2021/010003, filed on Mar. 12, 2021, 9 pages including English Translation.

*Primary Examiner* — Usman A Khan
(74) *Attorney, Agent, or Firm* — XSENSUS LLP

(57) ABSTRACT

A solid-state imaging apparatus includes: an imaging section that acquires image data; and a control section that causes DNN processing on the image data and readout processing of the image data to be executed in parallel and causes noise reduction processing to be executed on the image data that is read out when the DNN processing on the image data and the readout processing of the image data are being executed in parallel.

11 Claims, 16 Drawing Sheets

(56) References Cited

U.S. PATENT DOCUMENTS

2020/0043204 A1\* 2/2020 Fu .......................... G06N 3/084
2021/0006755 A1\* 1/2021 Kim ..................... G06T 3/4046

FOREIGN PATENT DOCUMENTS

WO 2018/051809 A1 3/2018
WO 2019/012370 A1 1/2019

\* cited by examiner

SOLID-STATE IMAGING APPARATUS FOR PERFORMING NOISE REDUCTION PROCESSING ON IMAGE DATA

CROSS-REFERENCE TO RELATED APPLICATIONS

The present application is based on PCT filing PCT/JP2021/010003, filed Mar. 12, 2021, which claims priority to Japanese Patent Application No. 2020-049488, filed Mar. 19, 2020, the entire contents of each are incorporated herein by reference.

TECHNICAL FIELD

The present disclosure relates to a solid-state imaging apparatus.

BACKGROUND ART

An image sensor having a complementary metal oxide semiconductor (CMOS) and a digital signal processor (DSP) is mounted on a device represented by a digital camera or the like. In the image sensor, a captured image is supplied to the DSP, is subjected to various pieces of processing in the DSP, and is outputted to an external apparatus such as an application processor.

CITATION LIST

Patent Document

Patent Literature 1: WO 2018/051809 A

SUMMARY OF THE INVENTION

Problems to be Solved by the Invention

However, in the above technology, in a case where the DSP executes heavy load processing or executes high-speed image data readout, there may be a case where processing by the DSP is not completed in a predetermined period such as one frame period and the DSP cannot appropriately execute the processing. Hence, in the above technology, image readout processing and DSP processing are executed in parallel to secure the time of DSP processing. In this case, noise may enter image data that is read out, and the quality of the image may be reduced.

Thus, the present disclosure proposes a solid-state imaging apparatus capable of appropriately executing processing.

Solutions to Problems

A solid-state imaging apparatus of an aspect according to the present disclosure includes: an imaging section that acquires image data; and a control section that causes DNN processing on the image data and readout processing of the image data to be executed in parallel and causes noise reduction processing to be executed on the image data that is read out when the DNN processing on the image data and the readout processing of the image data are being executed in parallel.

MODE FOR CARRYING OUT THE INVENTION

Figure 1:
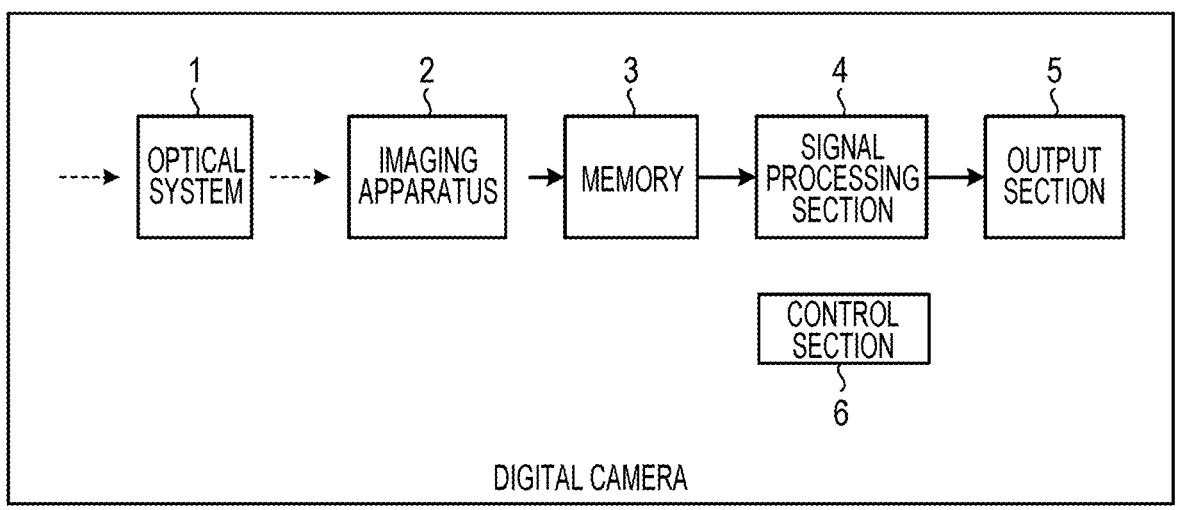
FIG. 1 is a block diagram showing an example of a configuration of a digital camera according to an embodiment.

Hereinbelow, embodiments of the present disclosure are described in detail on the basis of the drawings. Note that in the following embodiments, the same parts are marked with the same reference numerals, and a repeated description is omitted.

Note that the description is given in the following order.
1. Overview
   1-1. Configuration example of digital camera
   1-2. Configuration example of imaging apparatus
   1-3. External appearance configuration example of imaging apparatus
2. Comparative Example
   2-1. Processing mode of comparative example
3. Embodiments
   3-1. First processing mode
   3-1-1. Determination of timing of starting NR processing
   3-2. Second processing mode
   3-3. Control of time of DSP processing
   3-4. Method for controlling imaging processing
   3-5. Third processing mode
   3-6. Fourth processing mode
   3-7. Fifth processing mode
4. Effects 1. Overview 1-1. Configuration Example of Digital Camera FIG. 1 is a block diagram showing a configuration example of an embodiment of a digital camera to which the present technology is applied.

Note that the digital camera can capture both still images and moving images.

In FIG. 1, the digital camera includes an optical system 1, an imaging apparatus 2, a memory 3, a signal processing section 4, an output section 5, and a control section 6.

The optical system 1 includes, for example, a zoom lens, a focus lens, a diaphragm, etc. not illustrated, and causes light from the outside to be incident on the imaging apparatus 2.

The imaging apparatus 2 is, for example, a complementary metal oxide semiconductor (CMOS) image sensor formed by using one chip; and receives incident light from the optical system 1, performs photoelectric conversion, and outputs image data corresponding to the incident light from the optical system 1.

Further, the imaging apparatus 2 uses the image data or the like to perform, for example, recognition processing of recognizing a predetermined recognition target and other signal processing, and outputs a signal processing result of the signal processing.

The memory 3 temporarily stores the image data or the like outputted by the imaging apparatus 2.

The signal processing section 4 performs, as necessary, processing such as denoising and white balance adjustment as camera signal processing using the image data stored in the memory 3, and supplies the result to the output section 5.

The output section 5 outputs the image data from the signal processing section 4 or a signal processing result stored in the memory 3.

That is, the output section 5 includes, for example, a display (not illustrated) including liquid crystals or the like, and displays, as what is called a through image, an image corresponding to the image data from the signal processing section 4.

Further, the output section 5 includes, for example, a driver (not illustrated) that drives a recording medium such as a semiconductor memory, a magnetic disk, or an optical disk, and records, on the recording medium, the image data from the signal processing section 4 or a signal processing result stored in the memory 3.

Moreover, the output section 5 functions as, for example, an interface (I/F) that performs data transmission with an external apparatus, and transmits the image data from the signal processing section 4, the image data recorded on the recording medium, or the like to the external apparatus.

The control section 6 controls each block included in the digital camera in accordance with the user's operation or the like.

In the digital camera configured in the above manner, the imaging apparatus 2 captures an image. That is, the imaging apparatus 2 receives incident light from the optical system 1, performs photoelectric conversion, acquires image data corresponding to the incident light, and outputs the image data.

The image data outputted by the imaging apparatus 2 is supplied to and stored in the memory 3. The image data stored in the memory 3 is subjected to camera signal processing by the signal processing section 4, and the resulting image data is supplied to the output section 5 and is outputted.

Further, the imaging apparatus 2 performs signal processing by using an image (data) or the like obtained by imaging, and outputs a signal processing result of the signal processing. A signal processing result outputted by the imaging apparatus 2 is, for example, stored in the memory 3.

In the imaging apparatus 2, the output of an image itself obtained by imaging and the output of a signal processing result of signal processing using the image or the like are selectively performed.

1-2. Configuration Example of Imaging Apparatus

Figure 2:
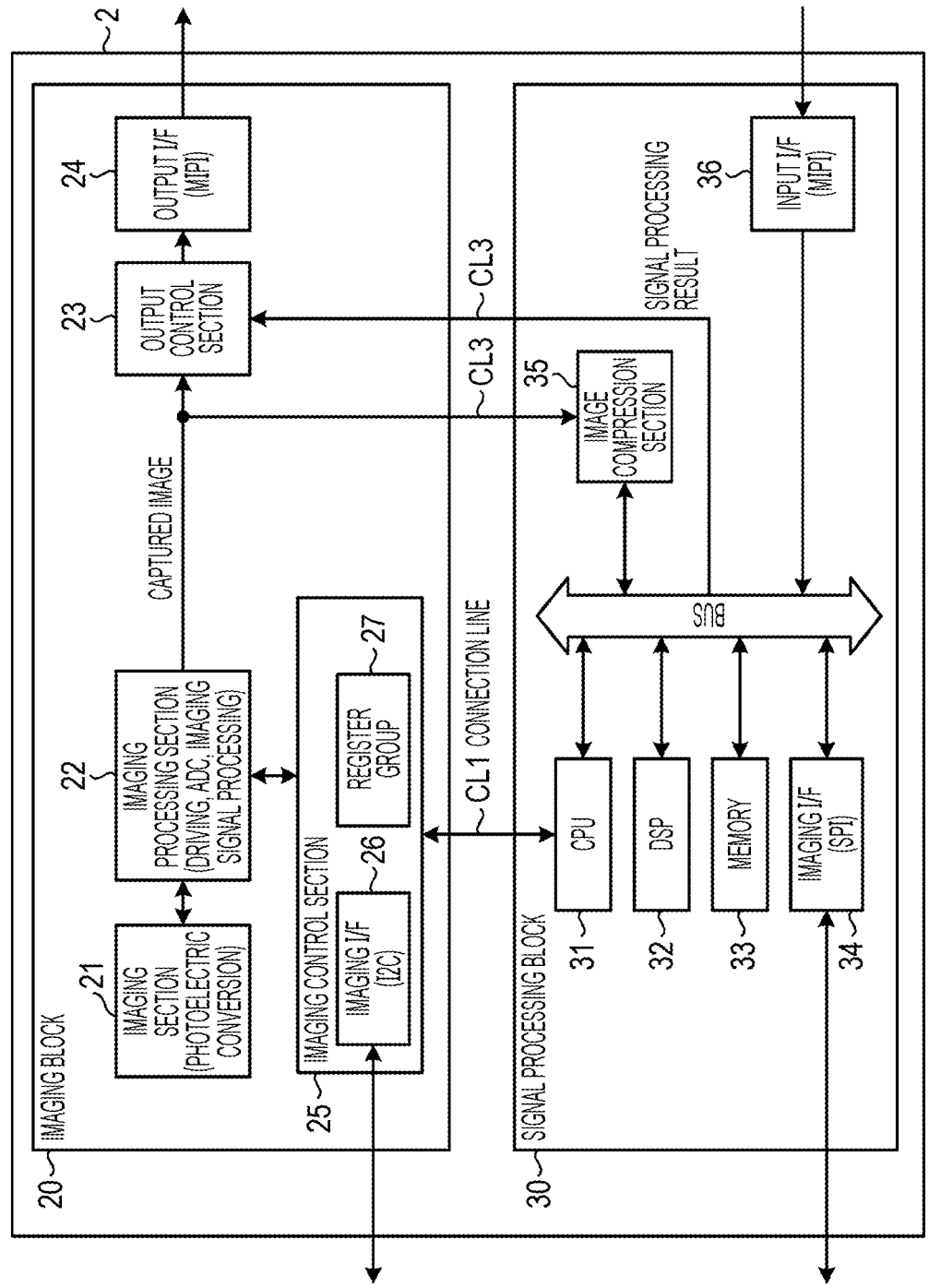
FIG. 2 is a block diagram showing an example of a configuration of an imaging apparatus according to an embodiment.

FIG. 2 is a block diagram showing a configuration example of the imaging apparatus 2 of FIG. 1.

In FIG. 2, the imaging apparatus 2 includes an imaging block 20 and a signal processing block 30. The imaging block 20 and the signal processing block 30 are electrically connected by connection lines (internal buses) CL1, CL2, and CL3.

The imaging block 20 includes an imaging section 21, an imaging processing section 22, an output control section 23, an output interface (I/F) 24, and an imaging control section 25, and captures an image.

The imaging section 21 includes a plurality of pixels arranged two-dimensionally. The imaging section 21 is driven by the imaging processing section 22, and captures an image.

That is, light from the optical system 1 (FIG. 1) is incident on the imaging section 21. In each pixel, the imaging section 21 receives incident light from the optical system 1, performs photoelectric conversion, and outputs an analog image signal corresponding to the incident light.

Note that the size of the image (signal) outputted by the imaging section 21 may be chosen from, for example, a plurality of sizes such as 12M (3968×2976) pixels and a video graphics array (VGA) size (640×480 pixels).

Further, the type of the image outputted by the imaging section 21 may be chosen from, for example, a color image of RGB (red, green, and blue) and a monochrome image of only luminance.

Each of these choices may be performed as a kind of setting of an imaging mode.

The imaging processing section 22 performs, in accordance with the control of the imaging control section 25, imaging processing related to the capture of an image in the imaging section 21, such as the driving of the imaging section 21, analog to digital (AD) conversion of an analog image signal outputted by the imaging section 21, or imaging signal processing.

Here, examples of the imaging signal processing include processing in which, for an image outputted by the imaging section 21, the brightness of each of predetermined small regions is obtained by a method such as calculating the average value of pixel values for each of the small regions, processing in which an image outputted by the imaging section 21 is converted to a high dynamic range (HDR) image, defect correction, development, etc.

The imaging processing section 22 outputs, as a captured image, a digital image signal (here, for example, an image of 12M pixels or a VGA size) obtained by AD conversion or the like of an analog image signal outputted by the imaging section 21.

A captured image outputted by the imaging processing section 22 is supplied to the output control section 23, and is also supplied to an image compression section 35 of the signal processing block 30 via connection line CL2.

To the output control section 23, a captured image is supplied from the imaging processing section 22, and a signal processing result of signal processing using a captured image or the like is supplied from the signal processing block 30 via connection line CL3.

The output control section 23 performs output control of causing a captured image from the imaging processing section 22 and a signal processing result from the signal processing block 30 to be selectively outputted from the (one) output I/F 24 to the outside (for example, the memory 3 of FIG. 1, or the like).

That is, the output control section 23 chooses a captured image from the imaging processing section 22 or a signal processing result from the signal processing block 30, and supplies the chosen thing to the output I/F 24.

The output I/F 24 is an I/F that outputs, to the outside, a captured image and a signal processing result supplied from the output control section 23. As the output I/F 24, for example, a relatively high-speed parallel I/F such as a mobile industry processor interface (MIPI), or the like may be used.

On the output I/F 24, a captured image from the imaging processing section 22 or a signal processing result from the signal processing block 30 is outputted to the outside in accordance with output control of the output control section 23. Therefore, for example, in a case where, in the outside, only a signal processing result from the signal processing block 30 is needed and a captured image itself is not needed, solely the signal processing result may be outputted, and the amount of data outputted from the output I/F 24 to the outside can be reduced.

Further, by a process in which signal processing that provides a signal processing result required in the outside is performed in the signal processing block 30 and the signal processing result is outputted from the output I/F 24, the necessity to perform signal processing in the outside is eliminated, and the load of an external block can be reduced.

The imaging control section 25 includes a communication I/F 26 and a register group 27.

The communication I/F 26 is, for example, a first communication I/F such as a serial communication I/F such as an inter-integrated circuit (I2C), and exchanges, with the outside (for example, the control section 6 of FIG. 1, or the like), necessary information such as information that is read from or written on the register 27 group.

The register group 27 includes a plurality of registers, and stores imaging information regarding the capture of an image in the imaging section 21 and various other pieces of information.

For example, the register group 27 stores imaging information received from the outside on the communication I/F 26 and a result of imaging signal processing in the imaging processing section 22 (for example, the brightness of each small region of a captured image, or the like).

Examples of the imaging information stored in the register group 27 include the ISO sensitivity (analog gain at the time of AD conversion in the imaging processing section 22), the exposure time (shutter speed), the frame rate, the focus, the imaging mode, the clipping range, etc. (or information indicating them).

Examples of the imaging mode include a manual mode in which the exposure time, the frame rate, etc. are manually set and an automatic mode in which they are automatically set in accordance with the scene. Examples of the automatic mode include modes corresponding to various imaging scenes such as a night scene and a person's face.

Further, the clipping range refers to a range clipped from an image outputted by the imaging section 21 in a case where the imaging processing section 22 clips part of an image outputted by the imaging section 21 and outputs the part as a captured image. By specifying the clipping range, for example, it becomes possible to clip, from an image outputted by the imaging section 21, solely a range where a person is present, or the like. Note that, as image clipping, there are a method in which clipping is performed from an image outputted by the imaging section 21 and furthermore a method in which solely an image (signal) of a clipping range is read out from the imaging section 21.

The imaging control section 25 controls the imaging processing section 22 in accordance with imaging information stored in the register group 27, and thus controls the capture of an image in the imaging section 21.

Note that the register group 27 can store imaging information and a result of imaging signal processing in the imaging processing section 22, and furthermore output control information regarding output control in the output control section 23. The output control section 23 can perform output control of causing a captured image and a signal processing result to be selectively outputted in accordance with output control information stored in the register group 27.

Further, in the imaging apparatus 2, the imaging control section 25 and a central processing unit (CPU) 31 of the signal processing block 30 are connected via connection line CL1, and the CPU 31 can perform the reading and writing of information on the register group 27 via connection line CL1.

That is, in the imaging apparatus 2, the reading and writing of information on the register group 27 can be performed not only from the communication I/F 26 but also from the CPU 31.

The signal processing block 30 includes a CPU 31, a digital signal processor (DSP) 32, a memory 33, a communication I/F 34, an image compression section 35, and an input I/F 36, and performs predetermined signal processing by using a captured image or the like obtained in the imaging block 10.

The CPU 31 to the input I/F 36 included in the signal processing block 30 are connected to each other via a bus, and can exchange information as necessary.

The CPU 31 executes a program stored in the memory 33 to perform the control of the signal processing block 30, the reading and writing of information on the register group 27 of the imaging control section 25 via connection line CL1, and various other pieces of processing. The CPU 31 is also called a control section.

For example, the CPU 31, by executing a program, functions as an imaging information calculation section that calculates imaging information by using a signal processing result obtained by signal processing in the DSP 32; and feeds back new imaging information calculated by using a signal processing result to the register group 27 of the imaging control section 25 via connection line CL1, and causes the register group 27 to store the new imaging information.

Therefore, as a result, the CPU 31 can control imaging in the imaging section 21 and imaging signal processing in the imaging processing section 22 in accordance with the signal processing result of a captured image.

Further, imaging information that the CPU 31 has caused the register group 27 to store can be provided (outputted) to the outside from the communication I/F 26. For example, focus information in the imaging information stored in the register group 27 can be provided from the communication I/F 26 to a focus driver (not illustrated) that controls the focus.

The DSP 32, by executing a program stored in the memory 33, functions as a signal processing section that performs signal processing using a captured image supplied from the imaging processing section 22 to the signal processing block 30 via connection line CL2 or information received by the input I/F 36 from the outside.

By reading out and executing a program that is subjected in advance to learning with teacher data and is stored as a learning model in the memory 33, the DSP 32 performs recognition processing using a deep neural network (DNN). That is, the DSP 32 is configured as a machine learning section.

The memory 33 includes a static random access memory (SRAM), a dynamic RAM (DRAM), or the like, and stores data or the like necessary for processing of the signal processing block 30.

For example, the memory 33 stores a program received from the outside on the communication I/F 34, a captured image compressed in the image compression section 35 and used for signal processing in the DSP 32, a signal processing result of signal processing performed in the DSP 32, information received by the input I/F 36, etc.

The communication I/F 34 is, for example, a second communication I/F such as a serial communication I/F such as a serial peripheral interface (SPI), and exchanges, with the outside (for example, the memory 3 or the control section 6 of FIG. 1, or the like), necessary information such as a program to be executed by the CPU 31 or the DSP 32.

For example, the communication I/F 34 downloads, from the outside, a program to be executed by the CPU 31 or the DSP 32, supplies the program to the memory 33, and causes the memory 33 to store the program.

Therefore, various pieces of processing can be executed in the CPU 31 or the DSP 32 by means of a program downloaded by the communication I/F 34.

Note that the communication I/F 34 can exchange, with the outside, arbitrary data in addition to programs. For example, the communication I/F 34 can output, to the outside, a signal processing result obtained by signal processing in the DSP 32. Further, the communication I/F 34 can output information according to an instruction of the CPU 31 to an external apparatus to control the external apparatus in accordance with the instruction of the CPU 31.

Here, a signal processing result obtained by signal processing in the DSP 32 can be outputted from the communication I/F 34 to the outside, and furthermore can be written on the register group 27 of the imaging control section 25 by the CPU 31. A signal processing result written on the register group 27 can be outputted from the communication I/F 26 to the outside. This similarly applies to the processing result of processing performed in the CPU 31.

To the image compression section 35, a captured image is supplied from the imaging processing section 22 via connection line CL2. The image compression section 35 performs compression processing of compressing a captured image, and generates a compressed image having a smaller amount of data than the captured image.

A compressed image generated in the image compression section 35 is supplied to the memory 33 via a bus, and is stored.

Here, signal processing in the DSP 32 can be performed by using a captured image itself, or can be performed by using a compressed image generated from a captured image in the image compression section 35. Since the compressed image has a smaller amount of data than the captured image, the load of signal processing in the DSP 32 can be reduced, and the storage capacity of the memory 33 that stores compressed images can be saved.

As compression processing in the image compression section 35, for example, scale-down in which a captured image of 12M (3968×2976) pixels is converted to an image of a VGA size may be performed. Further, in a case where the signal processing in the DSP 32 is performed on luminance and the captured image is an RGB image, YUV conversion in which the RGB image is converted to, for example, a YUV image may be performed as compression processing.

Note that the image compression section 35 can be obtained by using software, or can be obtained by using dedicated hardware.

The input I/F 36 is an I/F that receives information from the outside. The input I/F 36 receives, for example, an output of an external sensor (external sensor output) from the external sensor, supplies the output to the memory 33 via a bus, and causes the memory 33 to store the output.

As the input I/F 36, for example, a parallel I/F such as a mobile industry processor interface (MIPI), or the like may be used similarly to the output I/F 24.

Further, as the external sensor, for example, a distance sensor that senses information regarding distance may be used; further, as the external sensor, for example, an image sensor that senses light and outputs an image corresponding to the light, that is, an image sensor different from the imaging apparatus 2 may be used.

The DSP 32 can perform signal processing by using a captured image (or a compressed image generated from it) or by using an external sensor output that is received by the input I/F 36 from an external sensor like that described above and is stored in the memory 33.

In the one-chip imaging apparatus 2 configured in the above manner, signal processing using a captured image obtained by imaging in the imaging section 21 (or a compressed image generated from it) is performed in the DSP 32, and a signal processing result of the signal processing and the captured image are selectively outputted from the output I/F 24. Therefore, an imaging apparatus that outputs information required by the user can be configured in a small size.

Here, in a case where signal processing of the DSP 32 is not performed in the imaging apparatus 2 and thus a signal processing result is not outputted but a captured image is outputted from the imaging apparatus 2, that is, in a case where the imaging apparatus 2 is configured as an image sensor that merely captures and outputs an image, the imaging apparatus 2 may include only an imaging block 20 not including an output control section 23.

1-3. External Appearance Configuration Example of Imaging Apparatus

Figure 3:
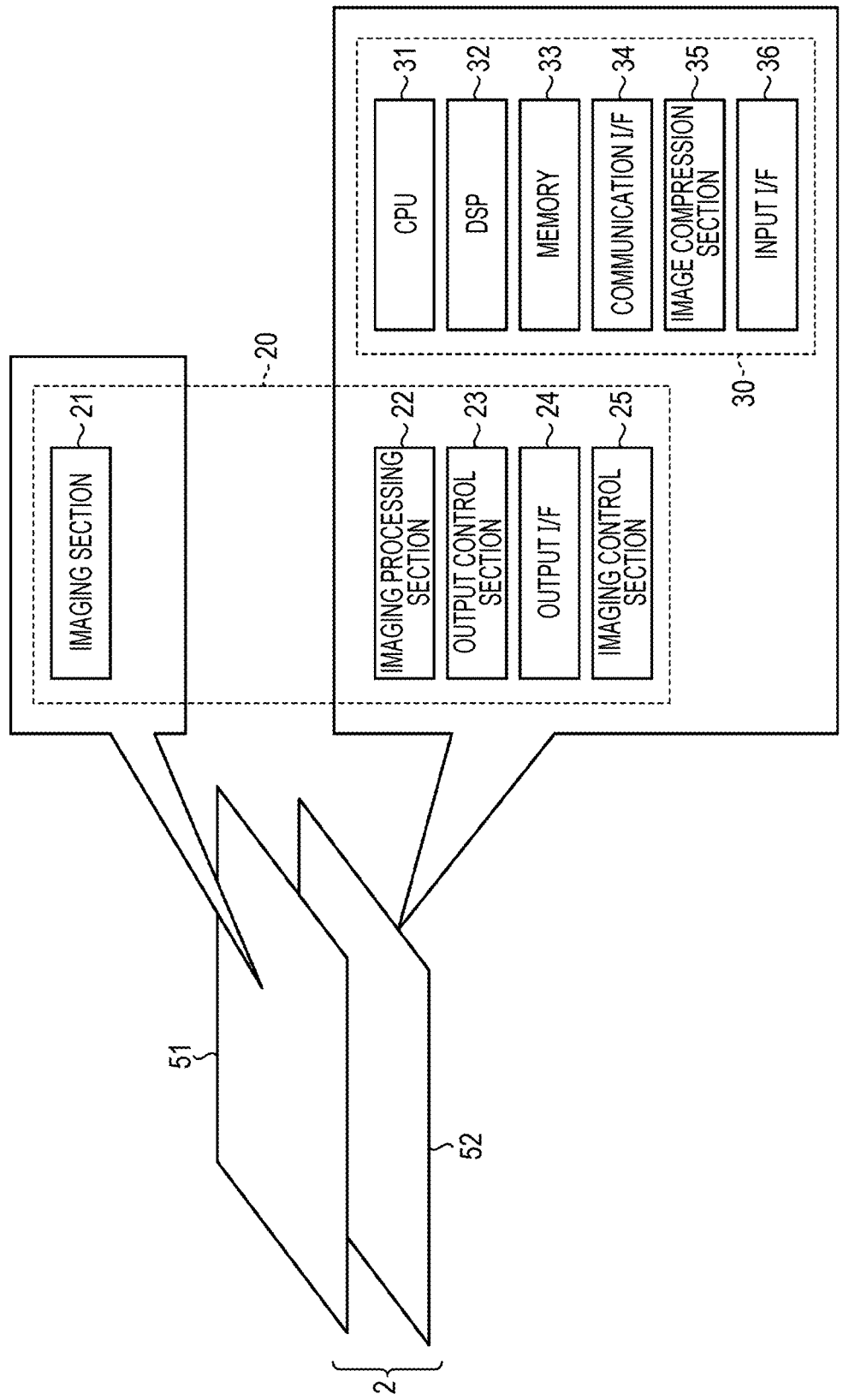
FIG. 3 is a perspective view showing an overview of an external appearance configuration example of an imaging apparatus.

FIG. 3 is a perspective view showing an overview of an external appearance configuration example of the imaging apparatus 2 of FIG. 1.

For example, as shown in FIG. 3, the imaging apparatus 2 may be configured as a one-chip semiconductor apparatus having a stacked structure in which a plurality of dies is stacked.

In FIG. 3, the imaging apparatus 2 is configured by stacking two dies of dies 51 and 52.

In FIG. 3, the imaging section 21 is mounted on the upper die 51, and the imaging processing section 22 to the imaging control section 25, and the CPU 31 to the input I/F 36 are mounted on the lower die 52.

The upper die 51 and the lower die 52 are electrically connected by, for example, forming a through hole that penetrates die 51 and reaches die 52, alternatively performing Cu-Cu joining that directly connects Cu wiring exposed on the lower surface side of die 51 and Cu wiring exposed on the upper surface side of die 52, or the like.

Here, in the imaging processing section 22, for example, a column-parallel AD system or an area AD system may be employed as a system for performing AD conversion of an image signal outputted by the imaging section 21.

In the column-parallel AD system, for example, an analog to digital converter (ADC) is provided for a pixel column included in the imaging section 21, and the ADC of each column is in charge of AD conversion of pixel signals of the pixels of the column; thus, AD conversions of image signals of the pixels of the columns of one row are performed in parallel. In a case where the column-parallel AD system is employed, part of the imaging processing section 22 that performs AD conversion of the column-parallel AD system may be mounted on the upper die 51.

In the area AD system, the pixels included in the imaging section 21 are divided into a plurality of blocks, and an ADC is provided for each block. Then, the ADC of each block is in charge of AD conversion of pixel signals of the pixels of the block, and thus AD conversions of image signals of the pixels of the plurality of blocks are performed in parallel. In the area AD system, AD conversion (readout and AD conversion) of image signals can be performed solely for necessary pixels among the pixels included in the imaging section 21, with a block as the minimum unit.

Note that if the area of the imaging apparatus 2 is allowed to be larger, the imaging apparatus 2 may be configured by using one die.

Further, although in FIG. 3 two dies 51 and 52 are stacked to configure a one-chip imaging apparatus 2, a one-chip imaging apparatus 2 may be configured by stacking three or more dies. For example, in a case where three dies are stacked to configure a one-chip imaging apparatus 2, the memory 33 of FIG. 3 may be mounted on another die.

Here, an imaging apparatus in which a sensor chip, a memory chip, and a DSP chip are connected in parallel by a plurality of bumps (hereinafter, also referred to as a bump-connected imaging apparatus) involves a great increase in thickness and an increase in size as compared to a one-chip imaging apparatus 2 configured in a stacked structure.

Moreover, due to signal degradation or the like in the connection portion of the bump, the bump-connected imaging apparatus may have difficulty in securing a sufficient rate to output captured images from the imaging processing section 22 to the output control section 23.

By using an imaging apparatus 2 of a stacked structure, it becomes possible to prevent a size increase of an apparatus like the above and inability to secure a sufficient rate between the imaging processing section 22 and the output control section 23.

Therefore, by using an imaging apparatus 2 of a stacked structure, an imaging apparatus that outputs information required by the user can be configured in a small size.

In a case where the information required by the user is a captured image, the imaging apparatus 2 can output a captured image.

Further, in a case where the information required by the user is obtained by signal processing using a captured image, the imaging apparatus 2, by performing the signal processing in the DSP 32, can obtain and output a signal processing result as information required by the user.

As signal processing performed in the imaging apparatus 2, that is, signal processing of the DSP 32, for example, recognition processing of recognizing a predetermined recognition target from a captured image may be employed.

2. Comparative Example

2-1. Processing Mode of Comparative Example

Figure 4:
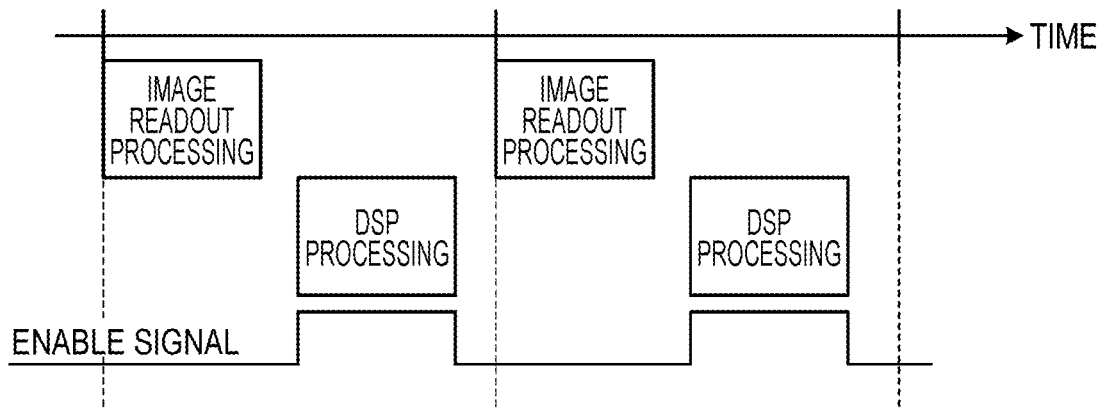
FIG. 4 is a diagram for describing a processing mode of a comparative example.

Next, a processing mode according to a comparative example is described. FIG. 4 is a diagram for describing a processing mode according to a comparative example.

As shown in FIG. 4, the CPU 31 keeps the enable signal at LOW while the processing of image readout from the imaging section 21 is being executed, and changes the enable signal to HIGH if the image readout processing is ended. Upon detecting that the enable signal is changed to HIGH, the DSP 32 starts DSP processing. After that, if the DSP processing is completed, the CPU 31 changes the enable signal to LOW. As a result, the next round of image readout processing is executed on the imaging section 21.

As shown in FIG. 4, in the comparative example, since DSP processing is executed after image readout, DSP processing may not be completed in one frame in a case where image readout takes long time or in a case where DSP processing takes long time.

3. Embodiments

3-1. First Processing Mode

Figure 5:
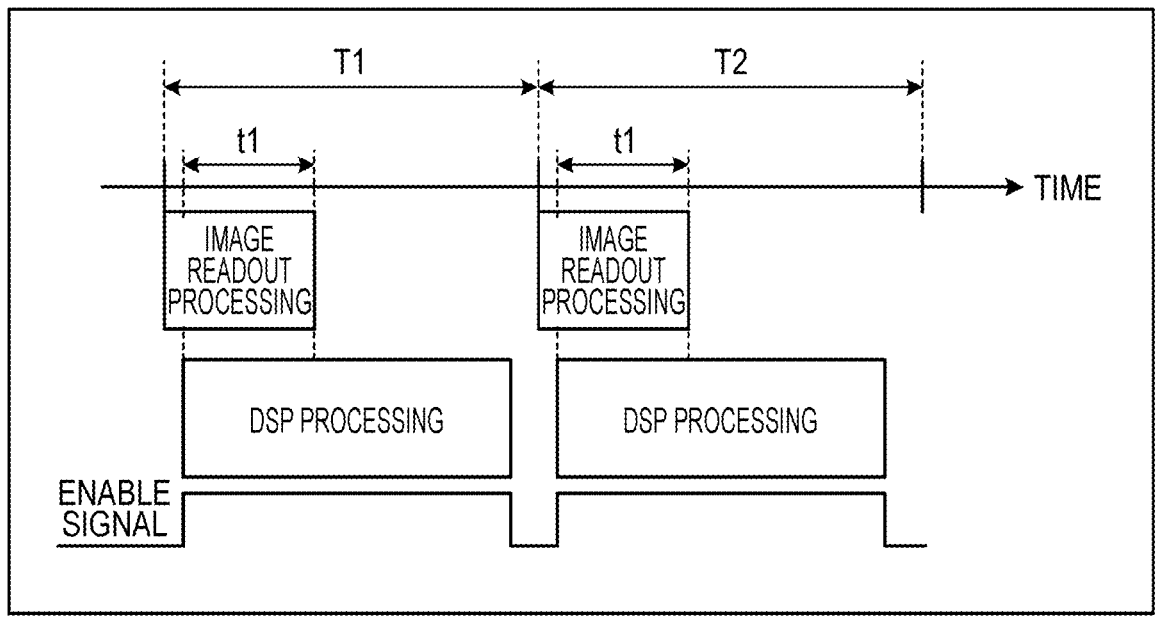
FIG. 5 is a diagram for describing a first processing mode according to an embodiment.

A first processing mode according to an embodiment will now be described using FIG. 5. FIG. 5 is a diagram for describing the first processing mode according to an embodiment.

As shown in FIG. 5, in a first embodiment, image readout processing and DSP processing are executed in parallel in order to secure the time of processing by the DSP 32. Specifically, image readout processing and DSP processing are executed in parallel in a predetermined period before the end of image readout processing and a predetermined period after the start of DSP processing. In this case, while image readout processing is being executed, the CPU 31 changes the enable signal to HIGH to cause the DSP 32 to execute DSP processing. In this case, in frame period T1, image readout processing and DSP processing overlap for period t1. In frame period T2, image readout processing and DSP processing overlap for period t1. In such a case, in the readout image, noise is generated in a region where image readout processing and DSP processing overlap. The CPU 31 outputs a control signal to the imaging control section 25 to cause the imaging processing section 22 to execute noise reduction processing (NR processing) for removing noise generated in the image.

Figure 6:
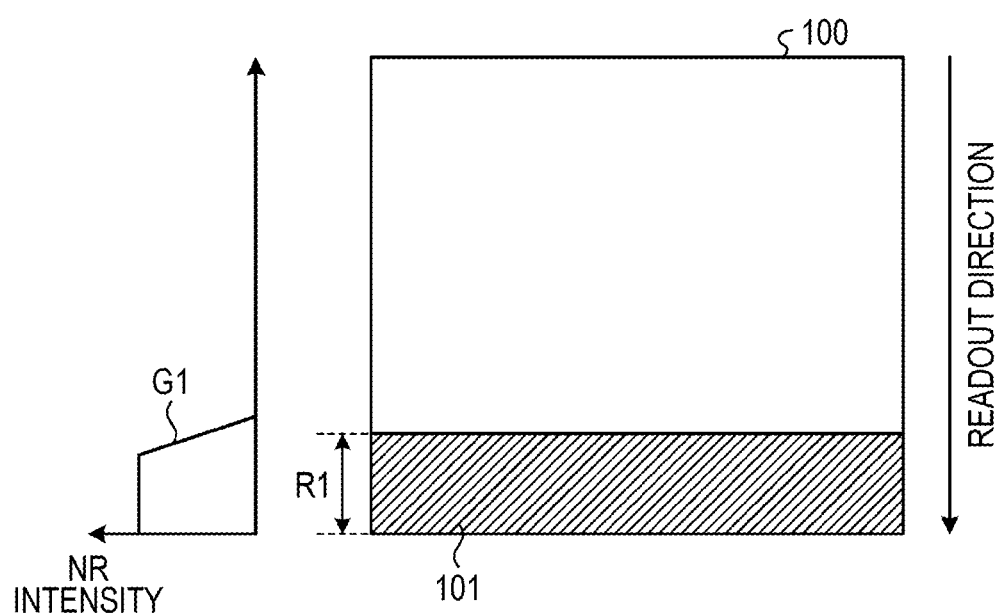
FIG. 6 is a diagram for describing NR processing.

FIG. 6 is a diagram for describing NR processing by the imaging processing section 22. FIG. 6 shows a readout image 100 read out by readout processing. In a readout image 100, the direction from the top to the bottom is the readout direction.

In a lower portion of the readout image 100, noise 101 is included in a region R1 corresponding to a region where readout processing and DSP processing overlap. The CPU 31 outputs, to the imaging control section 25, a control signal for causing the imaging processing section 22 to execute noise reduction processing for suppressing noise 101. The imaging control section 25 causes the imaging processing section 22 to execute NR processing for suppressing noise 101 in accordance with the control signal from the CPU 31. Specifically, the imaging processing section 22 executes NR processing on the pixel to suppress noise 101. Graph G1 shows the intensity of NR processing executed on the readout image 100. The CPU 31 may change the intensity of NR processing in accordance with the condition of noise 101.

By performing processing in such a way, the CPU 31 can remove noise generated in the readout image. Thus, in the first embodiment, noise 101 generated in the readout image 100 can be removed while the time of DSP processing is secured.

3-1-1. Determination of Timing of Starting NR Processing

In the present disclosure, to appropriately remove noise generated in the readout image, it is preferable to determine the timing at which image readout processing and DSP processing should overlap. Specifically, NR processing is preferably started at such a timing that a timing at which image readout processing and DSP processing overlap is a timing at which noise is generated. Thus, the processing of calculating the timing of starting NR processing in the present disclosure will now be described.

Figure 7:
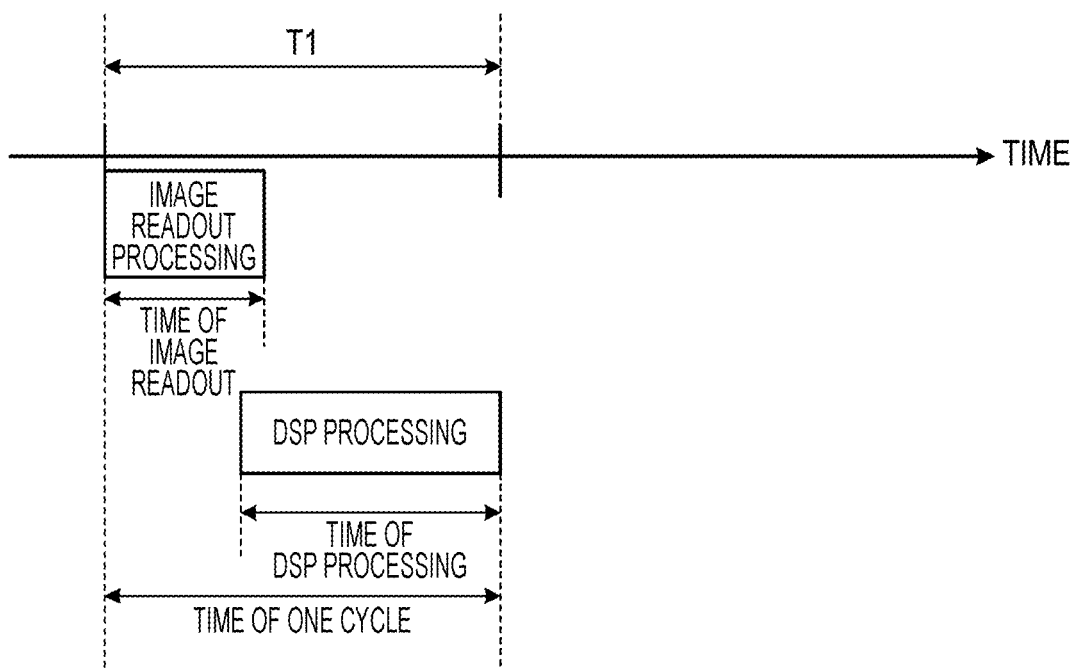
FIG. 7 is a diagram for describing a method for determining the timing of starting NR processing.

FIG. 7 is a diagram for describing a method for determining the timing of starting NR processing. In the present disclosure, the timing of starting NR processing is determined by the CPU 31.

In order to determine the timing of starting NR processing, the CPU 31 acquires the time of image readout, the time of DSP processing, and the time of one cycle (the time of frame period T1). The time of image readout and the time of one cycle are uniquely determined by a preset operating mode of the imaging apparatus 2. The time of DSP processing is uniquely determined by the configuration of the DNN. In other words, the CPU 31 calculates the time of image readout and the time of one cycle in accordance with the operating mode set in the imaging apparatus 2. Further, the CPU 31 acquires the time of DSP processing from the result of DSP execution by the DSP 32.

The CPU 31 calculates "the time of image readout+the time of DSP processing—the time of one cycle" to calculate the time during which image readout processing and DSP processing overlap (are executed in parallel). Then, the CPU 31 calculates "the time of image readout—the time during which image readout processing and DSP processing overlap" to calculate the timing of starting NR processing. That is, the CPU 31 can calculate the timing of starting NR processing by calculation.

3-2. Second Processing Mode

Figure 8:
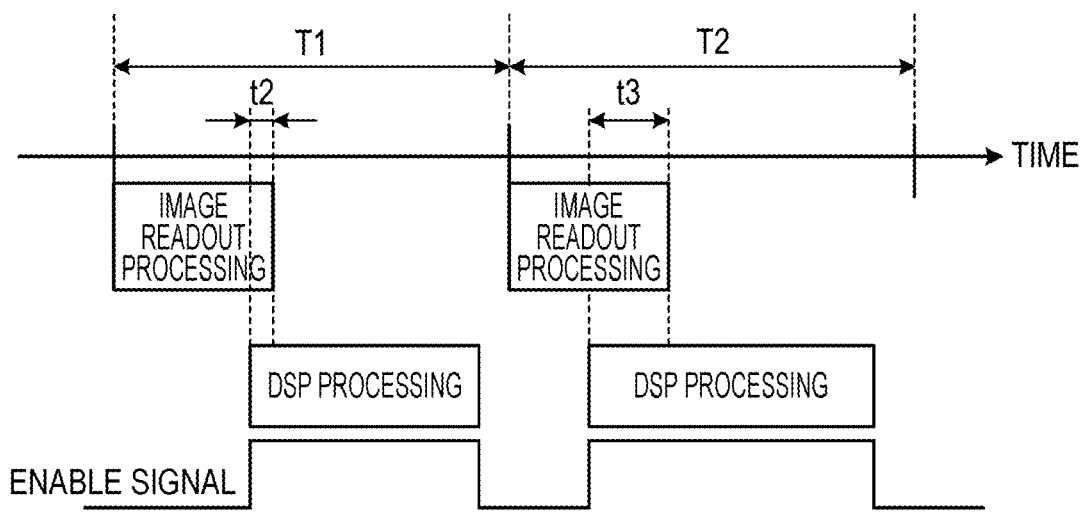
FIG. 8 is a diagram for describing a second processing mode according to an embodiment.

A second processing mode according to an embodiment will now be described using FIG. 8. FIG. 8 is a diagram for describing a second processing mode according to an embodiment.

As shown in FIG. 8, in the second processing mode, a period t2 when the image readout processing of frame period T1 and DSP processing overlap and a period t3 when the image readout processing of frame period T2 and DSP processing overlap are different. Specifically, period t3 is longer than period t2. In this case, in accordance with the time of DSP processing, the CPU 31 dynamically switches, for each frame period, the region where NR processing should be executed.

Figure 9A:
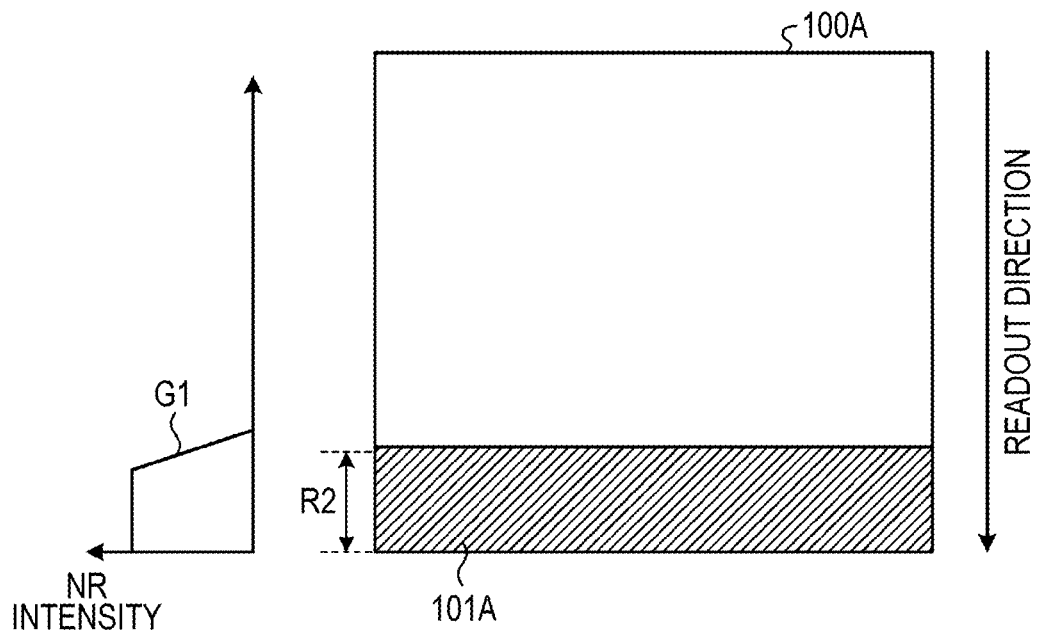
FIG. 9A is a diagram for describing a method for dynamically switching the region where NR processing should be executed.
Figure 9B:
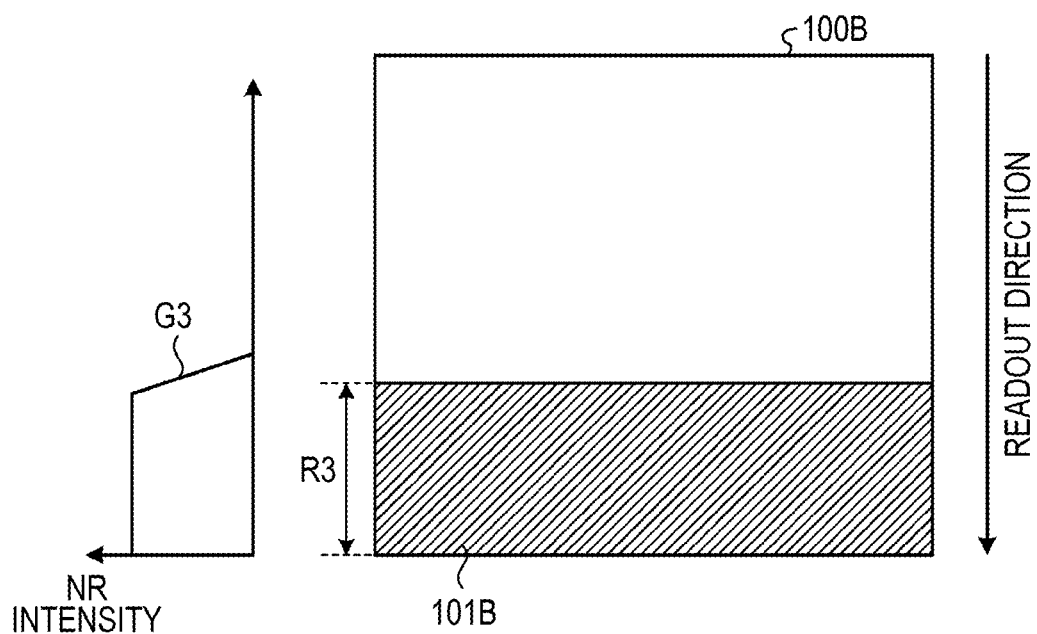
FIG. 9B is a diagram for describing a method for dynamically switching the region where NR processing should be executed.

A method for dynamically switching the region where NR processing should be executed will now be described using FIG. 9A and FIG. 9B. FIG. 9A and FIG. 9B are diagrams for describing a method for dynamically switching the region where NR processing should be executed.

FIG. 9A shows readout image 100A read out in frame period T1 of FIG. 8. As shown in FIG. 9A, in a lower portion of readout image 100A, noise 101A is included in a region R2 corresponding to a region where readout processing and DSP processing overlap. The CPU 31 outputs, to the imaging control section 25, a control signal for causing the imaging processing section 22 to execute NR processing for suppressing noise 101A. Graph G2 shows the intensity of NR processing executed on readout image 100A.

FIG. 9B shows a readout image 100B read out in frame period T2 of FIG. 8. As shown in FIG. 9B, in a lower portion of the readout image 100B, noise 101B is included in a region R3 corresponding to a region where readout processing and DSP processing overlap. The CPU 31 outputs, to the imaging processing section 22, a control signal for causing the imaging processing section 22 to execute NR processing for suppressing noise 101B. Graph G3 shows the intensity of NR processing executed on the readout image 100B.

As shown in FIG. 9A and FIG. 9B, for frame period T1 and frame period T2, the CPU 31 changes the region where NR processing should be executed. The size of region R2 of noise 101A of FIG. 9A and the size of region R3 of FIG. 9B are different. The CPU 31 calculates the timing of executing NR processing for each frame period. By calculating the timing of executing NR processing for each frame period, the CPU 31 can, in accordance with the time of DSP processing, dynamically change the region where NR processing should be executed. Further, in a case where the intensities of noises included in the readout images of frame periods are different, the CPU 31 may change the intensity of NR processing for each frame period.

3-3. Control of Time of DSP Processing

Figure 10A:
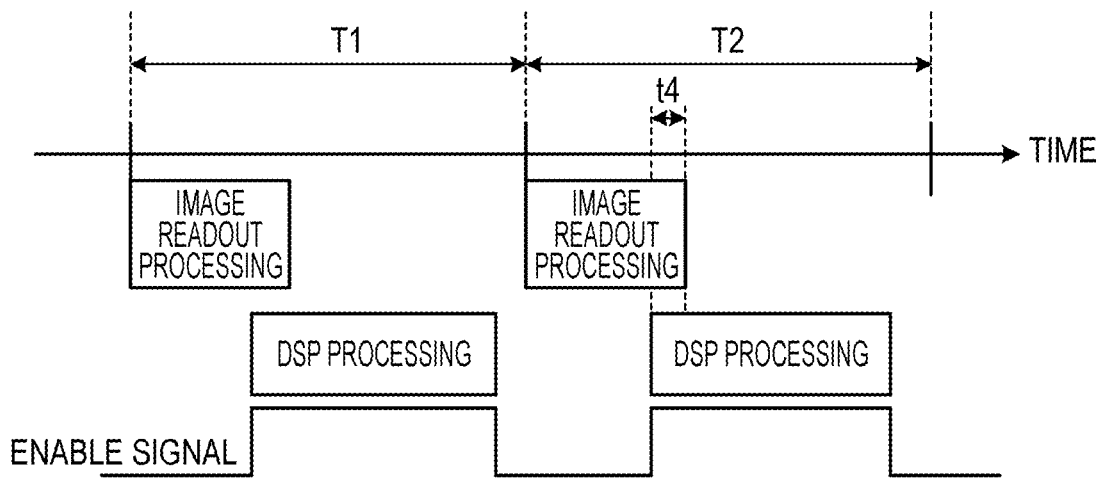
FIG. 10A is a diagram for describing a method for controlling the time of DSP processing.
Figure 10B:
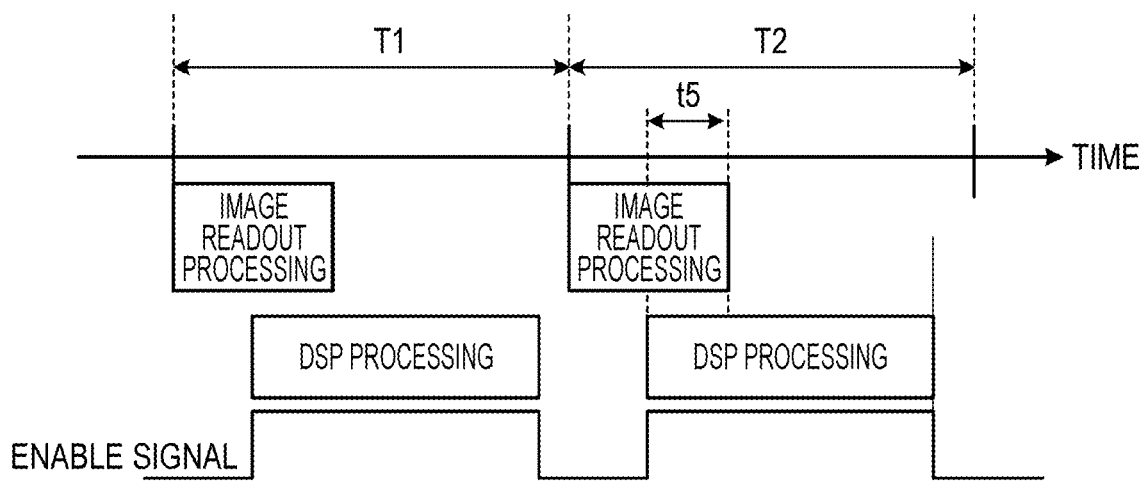
FIG. 10B is a diagram for describing a method for controlling the time of DSP processing.

A method for controlling the time of DSP processing according to an embodiment will now be described using FIG. 10A and FIG. 10B. FIG. 10A and FIG. 10B are diagrams for describing a method for controlling the time of DSP processing according to an embodiment.

As shown in FIG. 10A, in a case where the load of DSP processing is heavy, image readout processing and DSP processing are occasionally executed in parallel for period t4. Here, in a case where the load of DSP processing is heavy, it is supposed that the time of DSP processing is lengthened.

FIG. 10B shows an example in which the time of DSP processing shown in FIG. 10A is extended. In the example shown in FIG. 10B, image readout processing and DSP processing are executed in parallel for period t5. In this case, the CPU 31 advances the timing of setting the enable signal to HIGH to advance the timing of starting DSP processing. Here, the timing at which the CPU 31 sets the enable signal to LOW is similar to that in the case of FIG. 10A. That is, the CPU 31 controls the DSP 32 to advance the timing of starting DSP processing in a state where the timing of ending DSP processing is fixed. Thus, the CPU 31 can control the DSP 32 such that the period when image readout processing and DSP processing are executed in parallel is minimized.

3-4. Method for Controlling Imaging Processing

Figure 11:
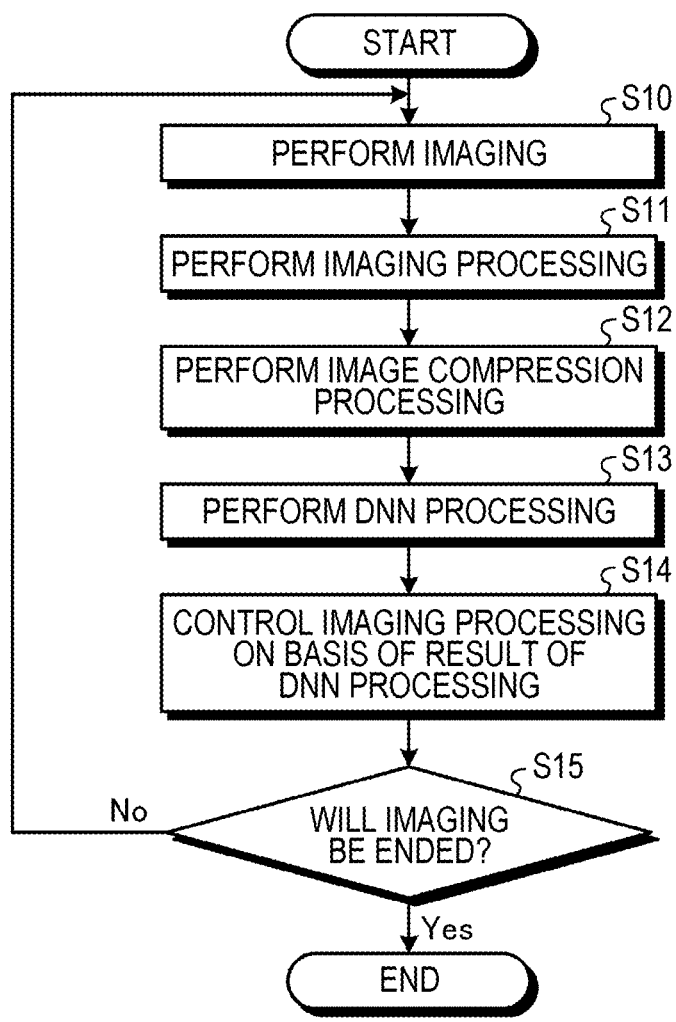
FIG. 11 is a flowchart showing an example of a process of the processing of controlling imaging processing on the basis of the result of the DNN processing.

A process of the processing of controlling imaging processing (for example, NR processing) on the basis of the result of the DNN processing will now be described using FIG. 11. FIG. 11 is a flowchart showing an example of a process of the processing of controlling imaging processing on the basis of the result of the DNN processing.

The CPU 31 outputs a control signal to the imaging control section 25 to cause the imaging section 21 to image the surrounding environment including an imaging target (step S10). Specifically, in accordance with a control signal of the CPU 31, the imaging control section 25 drives the imaging section 21 to cause the imaging section 21 to image the surrounding environment.

The CPU 31 outputs a control signal to the imaging control section 25 to cause the imaging processing section 22 to execute various pieces of imaging processing on the image captured by the imaging section 21 (step S11). The CPU 31 outputs a control signal to the imaging control section 25 to cause the imaging processing section 22 to execute image compression processing in order to execute the DNN processing on the image after imaging processing (step S12).

The CPU 31 outputs a control signal to the DSP 32 to cause the DSP 32 to execute the DNN processing on the image after image compression processing (step S13). The CPU 31 controls imaging processing on the basis of the result of the DNN processing (step S14). A method for controlling imaging processing based on the result of the DNN processing is described later.

The CPU 31 determines whether or not to end the imaging processing (step S15). In a case where it is determined to end the imaging processing (step S15: Yes), the processing of FIG. 11 is ended. On the other hand, in a case where it is determined to continue the imaging processing (step S15: No), the procedure goes to step S10.

Figure 12:
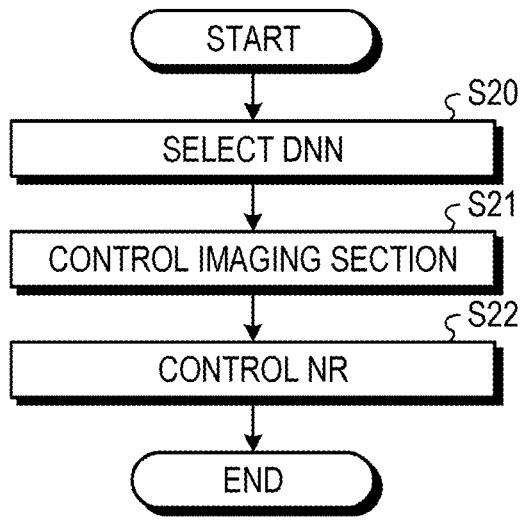
FIG. 12 is a flowchart showing an example of a process of the processing of a method for controlling NR processing based on the time of the DNN processing.

A method for controlling NR processing based on the time of the DNN processing will now be described using FIG. 12. FIG. 12 is a flowchart showing an example of a process of the processing of the method for controlling NR processing based on the time of the DNN processing.

The CPU 31 selects a DNN to be executed on the readout image (step S20). Specifically, the CPU 31 selects a DNN to be executed on the readout image in accordance with the time of the DNN processing.

The CPU 31 outputs a control signal to the imaging control section 25 to cause the imaging section 21 to image the surrounding environment including an imaging target (step S21). Specifically, in accordance with a control signal of the CPU 31, the imaging control section 25 drives the imaging section 21 to cause the imaging section 21 to image the surrounding environment.

The CPU 31 outputs a control signal to the imaging control section 25 to cause the imaging processing section 22 to execute NR processing on the image captured by the imaging section 21 (step S22). Specifically, in accordance with the time of DSP processing, the CPU 31 controls the region where NR processing should be caused to be executed.

Figure 13:
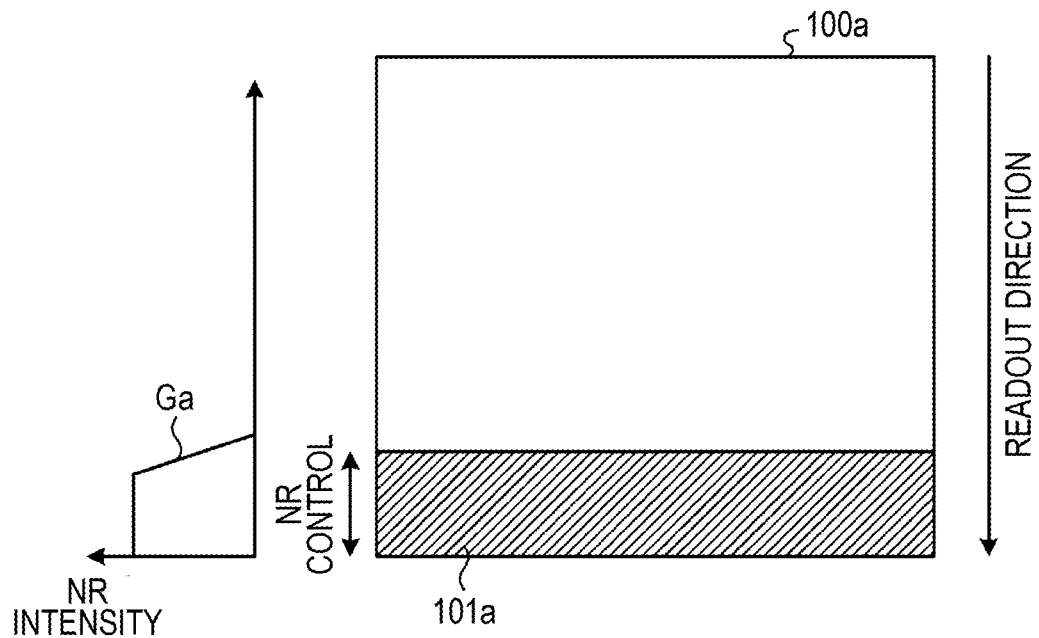
FIG. 13 is a diagram for describing a method for dynamically controlling NR processing.

FIG. 13 is a diagram for describing a method for dynamically controlling NR processing. As shown in FIG. 13, the readout image includes noise 101; the size of the region of noise 101 changes in accordance with the period when image readout processing and DSP processing are executed in parallel. The size of the region of noise 101 increases as the period when image readout processing and DSP processing are executed in parallel becomes longer, and decreases as this period becomes shorter. In other words, the size of the region of noise 101 increases as the time of DSP processing becomes longer, and decreases as this time becomes shorter. The CPU 31 controls the DSP 32 to dynamically control the timing of executing NR processing in accordance with the time of DSP processing. Specifically, the CPU 31 dynamically controls the timing of executing NR processing by controlling the timing of setting the enable signal to HIGH.

3-5. Third Processing Mode

Figure 14:
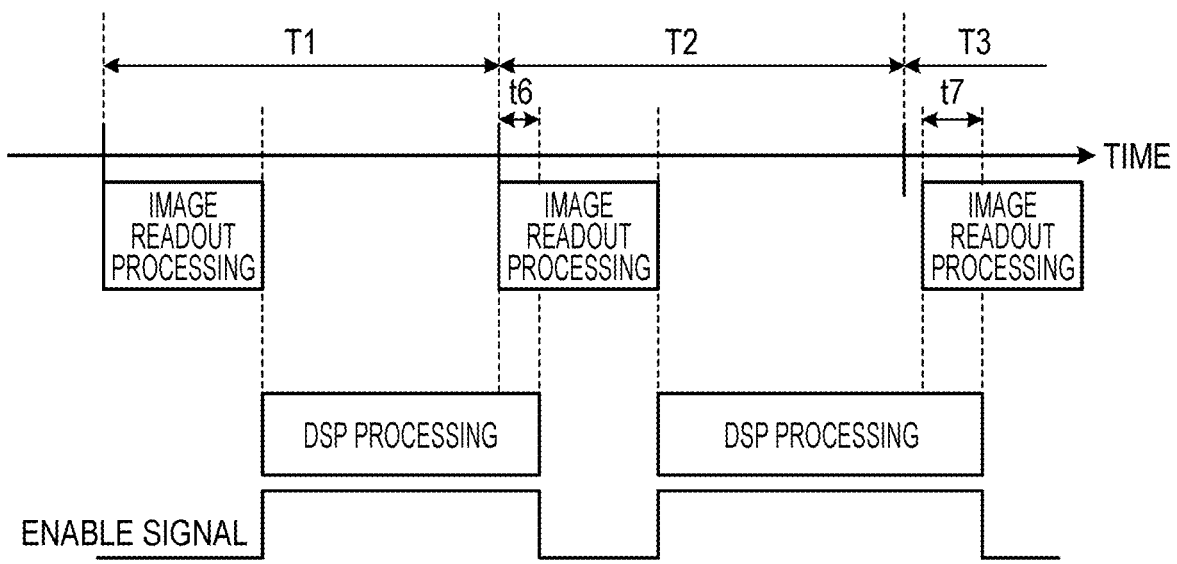
FIG. 14 is a diagram for describing a third processing mode according to an embodiment.

A third processing mode according to an embodiment will now be described using FIG. 14. FIG. 14 is a diagram for describing the third processing mode according to an embodiment.

As shown in FIG. 14, DSP processing started in frame period T1 is executed in parallel with image readout processing for period t6 in frame period T2. DSP processing started in frame period T2 is executed in parallel with image readout processing for period t7 in frame period T3. That is, in the example shown in FIG. 14, at the timing of starting image readout processing, DSP processing is executed in parallel.

In the example shown in FIG. 14, after image readout processing is ended in frame period T1, the CPU 31 sets the enable signal to HIGH to cause the DSP 32 to execute DSP processing. Then, in frame period T2, the CPU 31 causes image readout processing and DSP processing to be executed in parallel for period t6, and then sets the enable signal to LOW to end the DSP processing. Similarly, after image readout processing is ended in frame period T2, the CPU 31 sets the enable signal to HIGH to cause the DSP 32 to execute DSP processing. Then, in frame period T3, the CPU 31 causes image readout processing and DSP processing to be executed in parallel for period T7, and then sets the enable signal to LOW to end the DSP processing.

In the example shown in FIG. 14, readout processing of an upper portion of an image and DSP processing are executed in parallel. In this case, in a case where a subject with low importance in recognition processing, such as the sky, is transferred to an upper portion of an image, the CPU 31 controls the start timing, the execution time, etc. of DSP processing in the manner of the example shown in FIG. 14. That is, depending on the subject included in image data, the CPU 31 controls the period when the DNN processing on the image data and readout processing of the image data should be executed in parallel. Further, in FIG. 14, period t7 is longer than period t6. In this case, in accordance with the time of DSP processing, the CPU 31 dynamically switches the region where NR processing should be executed.

Figure 15A:
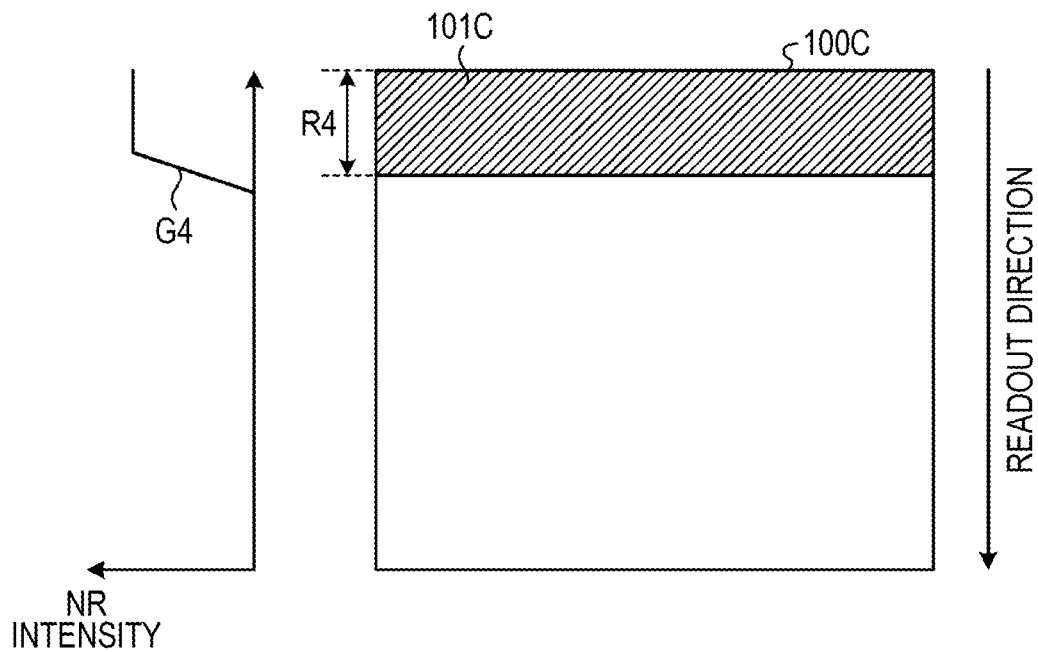
FIG. 15A is a diagram for describing a method for dynamically switching the region where NR processing should be executed.
Figure 15B:
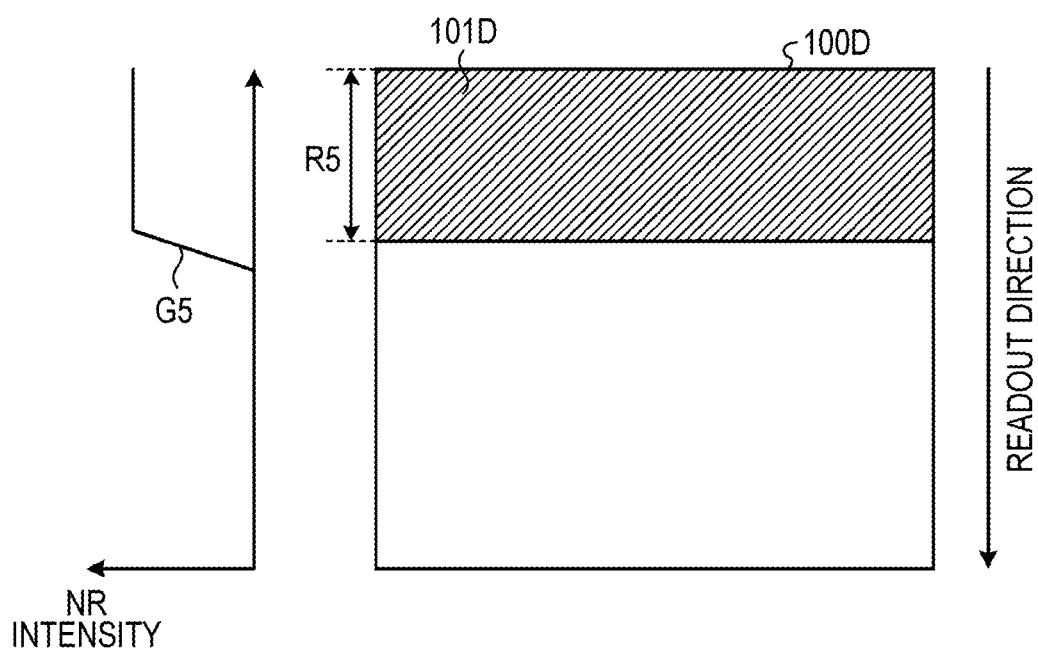
FIG. 15B is a diagram for describing a method for dynamically switching the region where NR processing should be executed.

A method for dynamically switching the region where NR processing should be executed will now be described using FIG. 15A and FIG. 15B. FIG. 15A and FIG. 15B are diagrams for describing a method for dynamically switching the region where NR processing should be executed.

FIG. 15A shows a readout image 100C read out in frame period T2 of FIG. 14. As shown in FIG. 15A, in an upper portion of the readout image 100C, noise 101C is included in a region R4 corresponding to a region where readout processing and DSP processing overlap. The CPU 31 outputs, to the imaging control section 25, a control signal for causing the imaging processing section 22 to execute NR processing for suppressing noise 101C. Graph G4 shows the intensity of NR processing executed on the readout image 100C.

FIG. 15B shows a readout image 100D read out in frame period T3 of FIG. 14. As shown in FIG. 15B, in an upper portion of the readout image 100D, noise 101D is included in a region R5 corresponding to a region where readout processing and DSP processing overlap. The CPU 31 outputs, to the imaging processing section 22, a control signal for causing the imaging processing section 22 to execute NR processing for suppressing noise 101D. Graph G5 shows the intensity of NR processing executed on the readout image 100D.

As shown in FIG. 15A and FIG. 15B, even if the region where NR processing should be executed is upper portions of the readout image 100C and the readout image 100D, the CPU 31 changes, for frame period T2 and frame period T3, the region where NR processing should be executed. The CPU 31 calculates the timing of executing NR processing for each frame. By calculating the timing of executing NR processing for each frame, the CPU 31 can, in accordance with the time of DSP processing, dynamically change the region where NR processing should be executed.

3-6. Fourth Processing Mode

Figure 16:
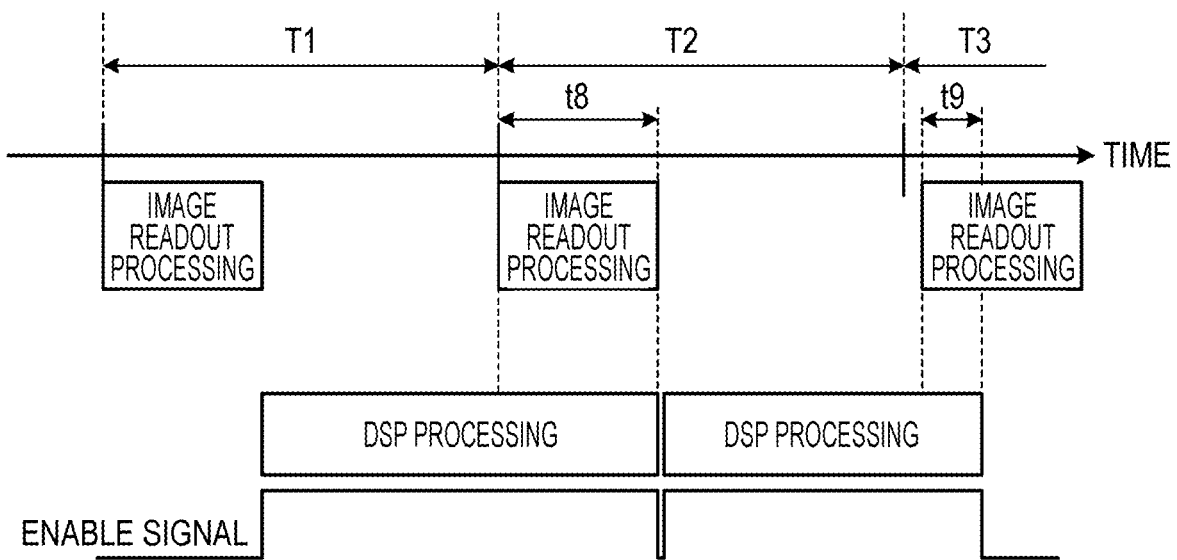
FIG. 16 is a diagram for describing a fourth processing mode according to an embodiment.

A fourth processing mode according to an embodiment will now be described using FIG. 16. FIG. 16 is a diagram for describing the fourth processing mode according to an embodiment.

As shown in FIG. 16, DSP processing started in frame period T1 is executed in parallel with image readout processing for period t8 in frame period T2. Here, the image readout processing in frame period T2 is executed in parallel with DSP processing over the entire period from the start to the end. DSP processing started in frame period T2 is executed in parallel with image readout processing for period t9 in frame period T3. In frame period T3, at the timing of starting image readout processing, DSP processing is executed in parallel.

As shown in FIG. 16, depending on the type of DSP processing, it is also supposed that DSP processing is executed over the entire period when image readout processing is being performed. In FIG. 16, the CPU 31 sets the enable signal to HIGH after image readout processing is ended in frame period T1, and sets the enable signal to LOW at the timing at which the image readout processing of frame period T2 is ended. In this case, the CPU 31 executes NR processing on the entire image read out in frame period T2. Further, for an upper portion of the image read out in frame period T3, the CPU 31 dynamically switches the region where NR processing should be executed.

Figure 17A:
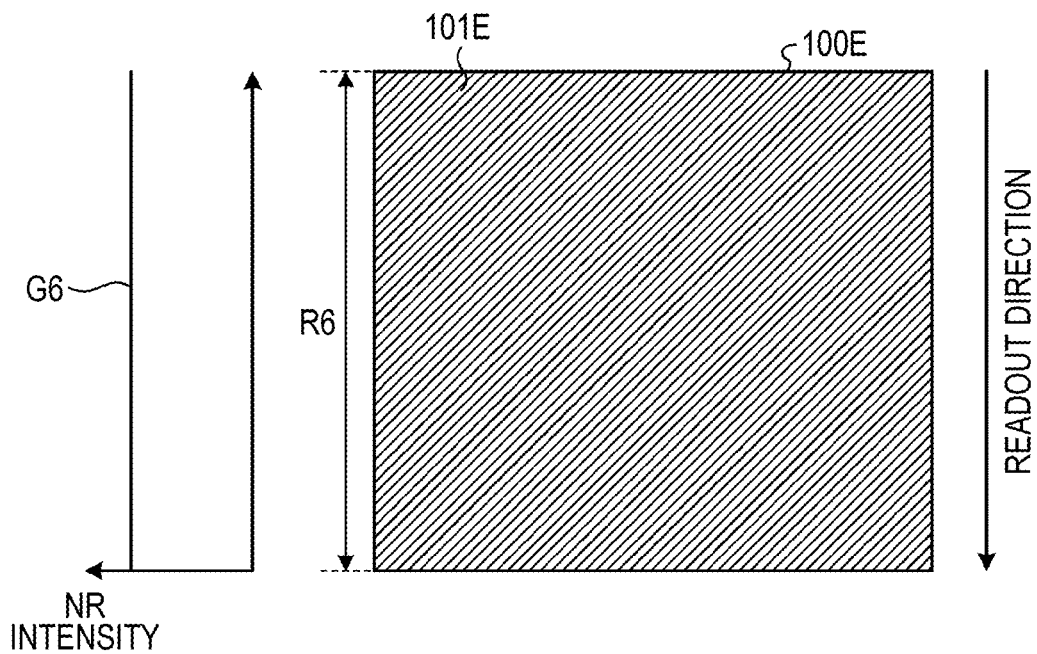
FIG. 17A is a diagram for describing a method for dynamically switching the region where NR processing should be executed.
Figure 17B:
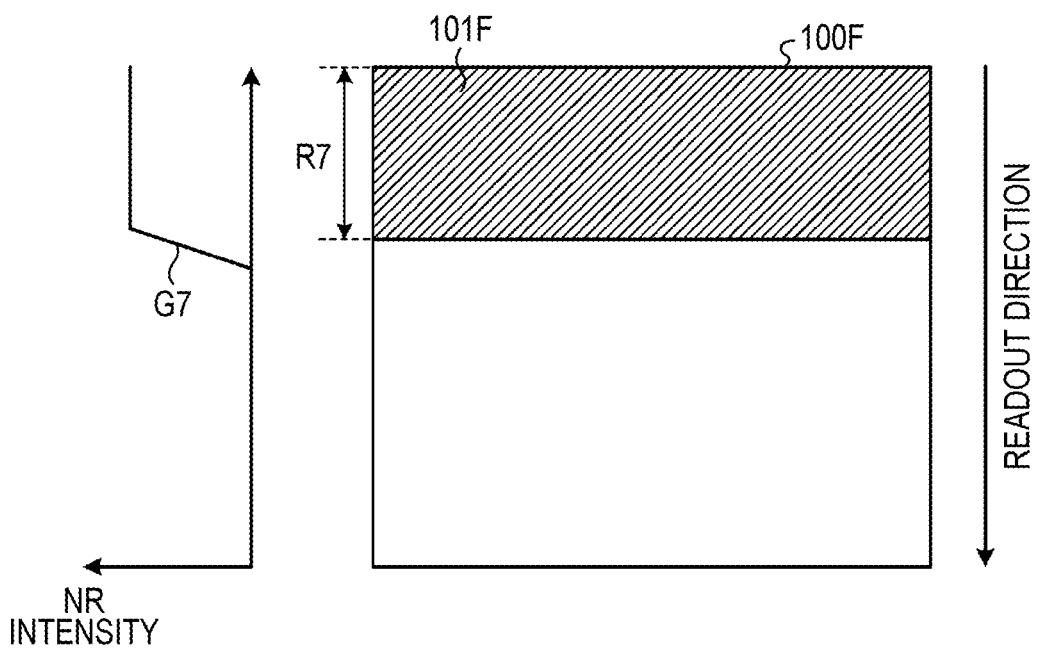
FIG. 17B is a diagram for describing a method for dynamically switching the region where NR processing should be executed.

A method for dynamically switching the region where NR processing should be executed will now be described using FIG. 17A and FIG. 17B. FIG. 17A and FIG. 17B are diagrams for describing a method for dynamically switching the region where NR processing should be executed.

FIG. 17A shows a readout image 100E read out in frame period T2 of FIG. 16. As shown in FIG. 17A, in the readout image 100E, noise 101E is generated over the entire region R6. The CPU 31 outputs, to the imaging control section 25, a control signal for causing the imaging processing section 22 to execute NR processing for suppressing noise 101E. Graph G6 shows the intensity of NR processing executed on the readout image 100E.

FIG. 17B shows a readout image 100F read out in frame period T3 of FIG. 16. As shown in FIG. 17B, in an upper portion of the readout image 100F, noise 101F is included in a region R7 corresponding to a region where readout processing and DSP processing overlap. The CPU 31 outputs, to the imaging processing section 22, a control signal for causing the imaging processing section 22 to execute NR processing for suppressing noise 101F. Graph G7 shows the intensity of NR processing executed on the readout image 100F.

As shown in FIG. 17A and FIG. 17B, even in a case where NR processing is executed on the entire region in frame period T2, the CPU 31 changes, for frame period T2 and frame period T3, the region where NR processing should be executed. The CPU 31 calculates the timing of executing NR processing for each frame. By calculating the timing of executing NR processing for each frame, the CPU 31 can, in accordance with the time of DSP processing, dynamically change the region where NR processing should be executed.

3-7. Fifth Processing Mode

Figure 18:
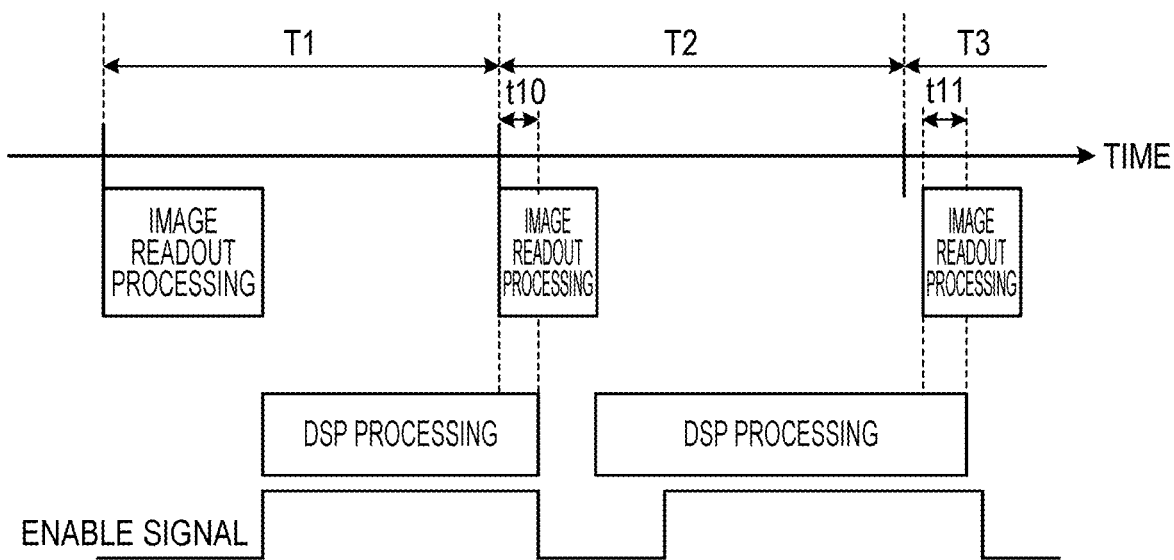
FIG. 18 is a diagram for describing a fifth processing mode according to an embodiment.

A fifth processing mode according to an embodiment will now be described using FIG. 18. FIG. 18 is a diagram for describing the fifth processing mode according to an embodiment.

As shown in FIG. 18, in a case where the load of DSP processing in frame period T2 is large, it is supposed that the time of DSP processing is lengthened. In this case, it is supposed that the image readout processing of frame period T2 might be first executed in parallel with the DSP processing of frame period T1 and finally executed in parallel with the DSP processing of frame period T2. In this case, the CPU 31 may shorten the time of the image readout processing of frame period T2 such that the image readout processing of frame period T2 is not executed in parallel with the DSP processing of frame period T2. Similarly, the time of the image readout processing of frame period T3 may be controlled to be shortened. Specifically, the CPU 31 needs only to output a control signal to the imaging control section 25 to reduce the time of image readout. Then, the CPU 31 may, on the basis of the amount of reduction in the time of image readout, switch the region where NR processing should be executed. That is, in a seventh embodiment, the CPU 31 dynamically switches the time of image readout processing and the time of DSP processing.

Figure 19A:
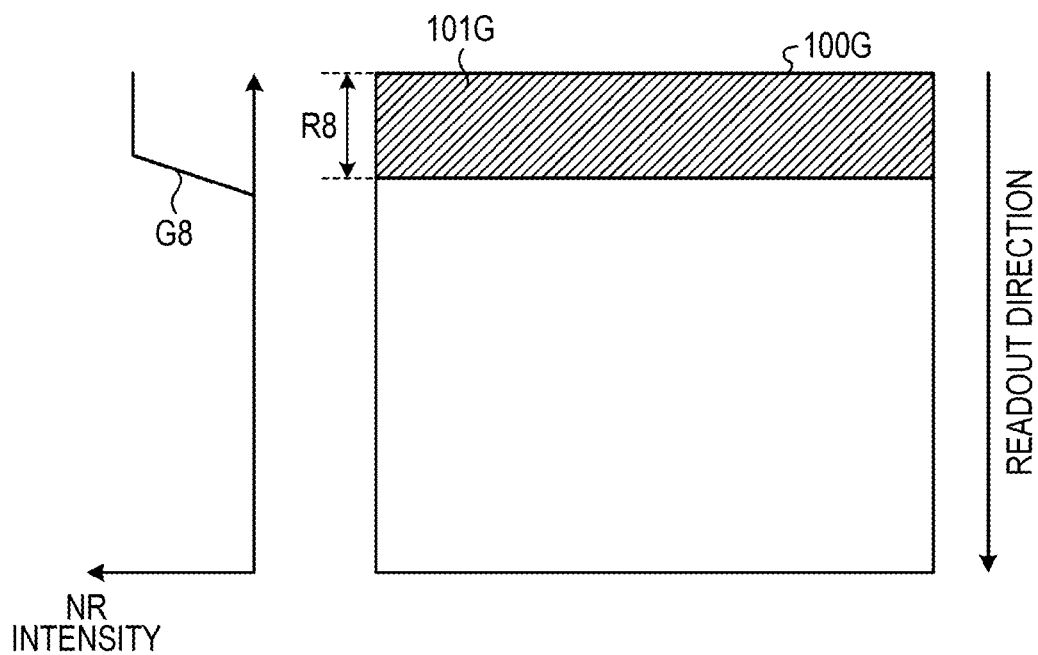
FIG. 19A is a diagram for describing a method for dynamically switching the region where NR processing should be executed.
Figure 19B:
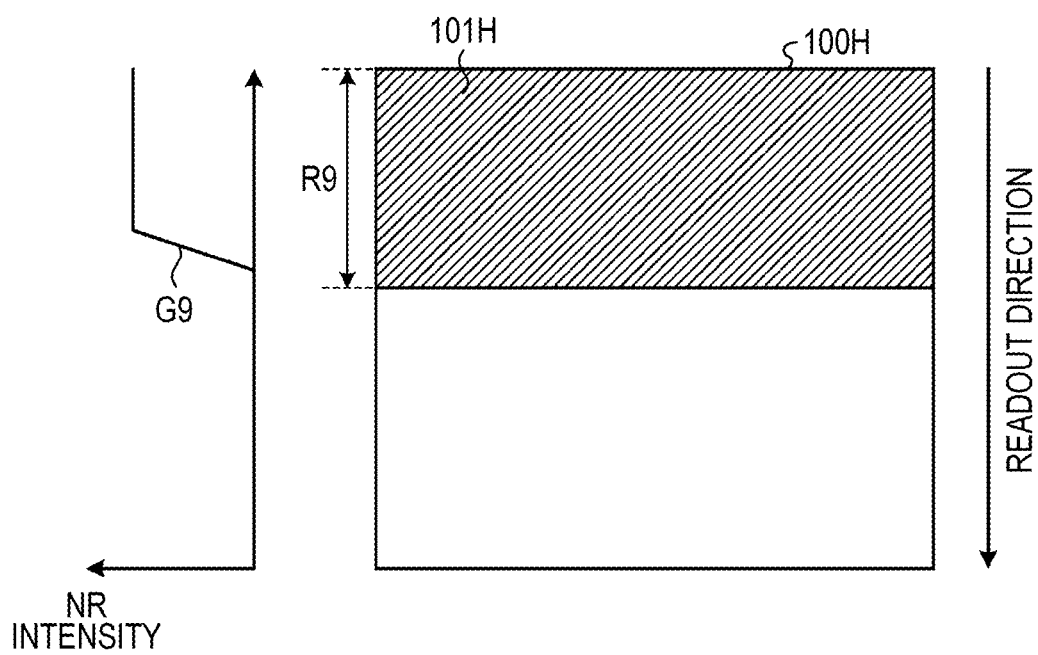
FIG. 19B is a diagram for describing a method for dynamically switching the region where NR processing should be executed.

A method for dynamically switching the region where NR processing should be executed will now be described using FIG. 19A and FIG. 19B. FIG. 19A and FIG. 19B are diagrams for describing a method for dynamically switching the region where NR processing should be executed.

FIG. 19A shows a readout image 100G read out in frame period T2 of FIG. 18. As shown in FIG. 19A, in an upper portion of the readout image 100G, noise 101G is included in a region R8 corresponding to a region where readout processing and DSP processing overlap. The CPU 31 outputs, to the imaging control section 25, a control signal for causing the imaging processing section 22 to execute NR processing for suppressing noise 101G. Graph G8 shows the intensity of NR processing executed on the readout image 100G.

FIG. 19B shows a readout image 100H read out in frame period T3 of FIG. 18. As shown in FIG. 19B, in an upper portion of the readout image 100H, noise 101H is included in a region R9 corresponding to a region where readout processing and DSP processing overlap. The CPU 31 outputs, to the imaging processing section 22, a control signal for causing the imaging processing section 22 to execute NR processing for suppressing noise 101H.

As shown in FIG. 19A and FIG. 19B, even in a case where NR processing is executed while the time of image readout is reduced, the CPU 31 changes, for frame period T2 and frame period T3, the region where NR processing should be executed. The CPU 31 calculates the timing of executing NR processing for each frame. By calculating the timing of executing NR processing for each frame, the CPU 31 can, in accordance with the time of DSP processing, dynamically change the region where NR processing should be executed.

4. Effects

A solid-state imaging apparatus 2 according to the present disclosure includes: an imaging section 21 that acquires image data; and a control section (CPU 31) that causes the DNN processing on image data and the readout processing of the image data to be executed in parallel and causes noise reduction processing to be executed on image data that is read out when the DNN processing on the image data and the readout processing of the image data are being executed in parallel.

Thus, the solid-state imaging apparatus 2 can suppress noise generated due to execution of the DNN processing and the readout processing of the image data in parallel, and therefore can appropriately execute processing in one frame period.

The CPU 31 controls the DNN processing on the image data and the readout processing of the image data such that a predetermined period before the end of the readout processing of the image data and a predetermined period after the start of the DNN processing on the image data overlap. Thus, the solid-state imaging apparatus 2 can suppress noise while securing the time of the DNN processing, and therefore can appropriately execute processing in one frame period.

The CPU 31 controls, for each frame period, the time during which the DNN processing on the image data and the readout processing of the image data should be executed in parallel. Thus, the solid-state imaging apparatus 2 can, for each frame period, control the region included in image data where noise should be suppressed, and therefore can appropriately execute processing in one frame period.

The CPU 31 performs control to advance the timing of starting the DNN processing on the image data in a state where the timing of ending the DNN processing on the image data is fixed. Thus, the solid-state imaging apparatus 2 can minimize the period when the DNN processing on the image data and the readout processing of the image data are executed in parallel, and therefore can appropriately execute processing in one frame period.

The CPU 31, depending on the subject included in image data, controls the period when the DNN processing on the image data and the readout processing of the image data should be executed in parallel. Thus, the solid-state imaging apparatus 2 can, depending on the subject, control the period when the DNN processing on the image data and the readout processing of the image data should be executed in parallel, and therefore can appropriately execute processing in one frame period.

The CPU 31 controls the DNN processing on the image data and the readout processing of the image data such that a predetermined period after the start of the readout processing of the image data and a predetermined period before the end of the DNN processing on the image data overlap. Thus, the solid-state imaging apparatus 2 can control the period when the DNN processing on the image data and the readout processing of the image data should be executed in parallel, and therefore can appropriately execute processing in one frame period.

The CPU 31 controls the DNN processing on the image data and the readout processing of the image data such that the entire period from the start to the end of the readout processing of the image data and a predetermined period before the end of the DNN processing on the image data overlap. Thus, the solid-state imaging apparatus 2 can control the period when the DNN processing on the image data and the readout processing of the image data should be executed in parallel, and therefore can appropriately execute processing in one frame period.

The CPU 31 dynamically controls the time of the DNN processing on the image data and the time of the readout processing of the image data. Thus, the solid-state imaging apparatus 2 can dynamically control the time of the DNN processing on the image data and the time of the readout processing of the image data, and therefore can appropriately execute processing in one frame period.

Further, the effects described in the present specification are merely explanatory or exemplified effects, and are not limitative ones. That is, the technology according to the present disclosure can achieve, together with or in place of the above effects, other effects that are clear to those skilled in the art from the description of the present specification.

Additionally, the present technology may also be configured as below.

(1)

A solid-state imaging apparatus including:
  an imaging section that acquires image data; and
  a control section that causes the DNN processing on the image data and readout processing of the image data to be executed in parallel and causes noise reduction processing to be executed on the image data that is read out when the DNN processing on the image data and the readout processing of the image data are being executed in parallel.

(2)

The solid-state imaging apparatus according to (1), in which
  the control section controls the DNN processing on the image data and the readout processing of the image data such that a predetermined period before an end of the readout processing of the image data and a predetermined period after a start of the DNN processing on the image data overlap.

(3)
The solid-state imaging apparatus according to (1) or (2), in which
the control section controls, for each frame period, time during which the DNN processing on the image data and the readout processing of the image data should be executed in parallel.

(4)
The solid-state imaging apparatus according to any one of (1) or (3), in which
the control section performs control to advance a timing of starting the DNN processing on the image data in a state where a timing of ending the DNN processing on the image data is fixed.

(5)
The solid-state imaging apparatus according to any one of (1) or (4), in which
the control section, depending on a subject included in the image data, controls a period when the DNN processing on the image data and the readout processing of the image data should be executed in parallel.

(6)
The solid-state imaging apparatus according to (5), in which
the control section controls the DNN processing on the image data and the readout processing of the image data such that a predetermined period after a start of the readout processing of the image data and a predetermined period before an end of the DNN processing on the image data overlap.

(7)
The solid-state imaging apparatus according to (1), in which
the control section controls the DNN processing on the image data and the readout processing of the image data such that an entire period from a start to an end of the readout processing of the image data and a predetermined period before an end of the DNN processing on the image data overlap.

(8)
The solid-state imaging apparatus according to any one of (1) or (7), in which
the control section dynamically controls time of the DNN processing on the image data and time of the readout processing of the image data.

REFERENCE SIGNS LIST

1 Optical system
2 Imaging apparatus
3 Memory
4 Signal processing section
5 Output section
6 Control section
20 Imaging block
21 Imaging section
22 Imaging processing section
23 Output control section
24 Output I/F
25 Imaging control section
26 Communication I/F
27 Register group
30 Signal processing block
31 CPU
32 DSP
33 Memory
34 Communication I/F
35 Image compression section
36 Input I/F
51, 52 Die

The invention claimed is:

1. A solid-state imaging apparatus comprising:
an imager that acquires image data; and
circuitry configured to
cause deep neural network (DNN) processing on the image data and readout processing of the image data to be executed in parallel and causes noise reduction processing to be executed on the image data that is read out when the DNN processing on the image data and the readout processing of the image data are being executed in parallel; and
perform control to advance a timing of starting the DNN processing on the image data in a state where a timing of ending the DNN processing on the image data is fixed.

2. The solid-state imaging apparatus according to claim 1, wherein
the circuitry controls the DNN processing on the image data and the readout processing of the image data such that a predetermined period before an end of the readout processing of the image data and a predetermined period after a start of the DNN processing on the image data overlap.

3. The solid-state imaging apparatus according to claim 1, wherein
the circuitry controls, for each frame period, time during which the DNN processing on the image data and the readout processing of the image data should be executed in parallel.

4. The solid-state imaging apparatus according to claim 1, wherein
the circuitry, depending on a subject included in the image data, controls a period when the DNN processing on the image data and the readout processing of the image data should be executed in parallel.

5. The solid-state imaging apparatus according to claim 4, wherein
the circuitry controls the DNN processing on the image data and the readout processing of the image data such that a predetermined period after a start of the readout processing of the image data and a predetermined period before an end of the DNN processing on the image data overlap.

6. The solid-state imaging apparatus according to claim 1, wherein
the circuitry controls the DNN processing on the image data and the readout processing of the image data such that an entire period from a start to an end of the readout processing of the image data and a predetermined period before an end of the DNN processing on the image data overlap.

7. The solid-state imaging apparatus according to claim 1, wherein
the circuitry dynamically controls time of the DNN processing on the image data and time of the readout processing of the image data.

8. A method comprising:
acquiring, by an imager, image data; and
causing, by circuitry, deep neural network (DNN) processing on the image data and readout processing of the image data to be executed in parallel and causes noise reduction processing to be executed on the image data that is read out when the DNN processing on the image data and the readout processing of the image data are being executed in parallel; and performing control to advance a timing of starting the DNN processing on the image data in a state where a timing of ending the DNN processing on the image data is fixed.

9. The method of claim 8, further comprising:

controlling the DNN processing on the image data and the readout processing of the image data such that a predetermined period before an end of the readout processing of the image data and a predetermined period after a start of the DNN processing on the image data overlap.

10. The method of claim 8, further comprising:

controlling, for each frame period, time during which the DNN processing on the image data and the readout processing of the image data should be executed in parallel.

11. A non-transitory computer-readable medium storing executable instructions which, when executed by circuitry, perform a method, the method comprising:

acquiring, by an imager, image data; and causing, by the circuitry, deep neural network (DNN) processing on the image data and readout processing of the image data to be executed in parallel and causes noise reduction processing to be executed on the image data that is read out when the DNN processing on the image data and the readout processing of the image data are being executed in parallel; and performing control to advance a timing of starting the DNN processing on the image data in a state where a timing of ending the DNN processing on the image data is fixed.

* * * * *